… …
United States Patent Office 3,536,781
Patented Oct. 27, 1970

---

3,536,781
CHARGE-TRANSFER POLYMER BLENDS
Robert J. Cotter, Bernardsville, and Theodore Sulzberg, Piscataway, N.J., assignors to Union Carbide Corporation, a corporation of New York
No Drawing. Filed Feb. 1, 1968, Ser. No. 702,195
Int. Cl. C08g 39/10
U.S. Cl. 260—860     29 Claims

ABSTRACT OF THE DISCLOSURE

A new class of polymers called charge-transfer polymers has been prepared by polymer-polymer interaction of condensation polymers containing electron-donating groups and condensation polymers containing electron-accepting groups. In contrast to the individual condensation polymers which are either colorless or lightly colored, the charge-transfer polymer blends have vivid, permanent colorations. The resultant polymer blends have volume resistivities lower than the original condensation polymers with some in the range of semi-conductors. The charge-transfer polymer blends of this invention have been used to make useful films, coatings, shaped articles, and fibers which are all permanently colored.

---

This invention relates to mixtures or blends of condensation polymers and more particularly to blends of condensation polymers containing electron-donating groups with condensation polymers containing electron-accepting groups.

There is a continuing serach for synthetic organic polymers having physical and chemical characteristics which qualify them for use as films, various types of shaped articles, coatings, fibers and the like. In many instances dyes or colorants are added to polymers for aesthetic reasons. Quite often, dyes change color with aging or are partially leached out of the polymer on exposure to the elements or on contact with solvent environments. Synthetic fibers have their own unique problems in that many are dye resistant and have to be subjected to special treatments to make them dye receptive.

It has now been found that by mechanically blending certain classes of colorless or lightly colored condensation polymers, a charge-transfer polymer blend can be obtained which has a permanent color. This discovery was achieved by choosing as the first class of condensation polymers ones which have electron-accepting groups thereon and as the second class of condensation polymers those having electron-donating groups thereon. The charge-transfer accompanying the mechanical blending of these two classes of condensation polymers produces a highly colored, permanent polymer blend. In addition, the volume resistivities of some of these charge-transfer polymer blends are in the range of about $10^{+3}$ to $10^{+10}$ ohm=centimeters which classifies them as semi-conductors. Neither of the condensation polymers alone have volume resistivities in this range.

Charge-transfer complexes are defined as being formed from the interaction of a wide variety of molecules, primarily aromatics, which can behave as electron donors or electron acceptors.

The terms "electron-donating or releasing" and "electron-accepting or attracting" are used in the usual context as applied to aromatic nuclei by L. F. Feiser and M. Feiser, "Advanced Organic Chemistry," Reinhold Publishing Company, N.Y., 1961, pp. 626–8. The former tends to make the aromatic ring relatively more negative than an unsubstituted ring and have a dipole moment from substituent to ring, e.g.,

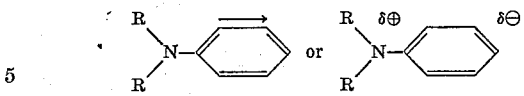

Conversely, electron accepting groups decrease the electron density on the aromatic ring:

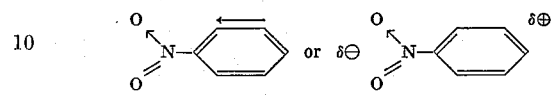

In the charge-transfer interaction, an electron is transferred from the donor to the acceptor thereby giving rise to a light absorption whose wavelength is relative to the ease of this transfer. By varying the donor and acceptor, a range of interactions are obtained.

Generally, this interaction tends to take the form of a low energy (i.e., visible wavelength absorption) charge-transfer from donor species to acceptor species thus giving rise to both electrical and visual effects. The latter can be seen readily by combining a donor polymer and an acceptor polymer in solution or in the melt and observing the color formation. Likewise, this can be done spectrophotometrically.

The charge-transfer polymer blends of this invention are mixtures of normally solid linear polymers comprising:

(a) 5 to 95 percent by weight of an electron donor polymer having the general formula:

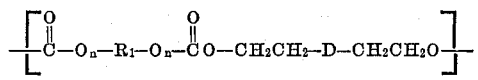

wherein $R_1$ is selected from the group consisting of divalent hydrocarbon radicals having from 1 to about 30 carbon atoms, $n$ is a whole number having a value from 0 to 1 and D is a divalent nitrogen radical having a formula selected from the following:

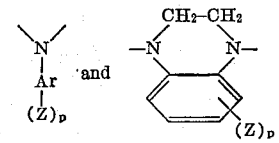

wherein Ar is an aromatic hydrocarbon having from 6 to about 30 carbon atoms, Z is a monovalent radical selected from the group consisting of alkylamino, dialkylamino, amino, alkoxyl, and hydroxyl radicals with the alkyl groups having from 1 to 6 carbon atoms and $p$ is an integer having values from 0 to 3; and (b) about 95 to 5 percent by weight of an electron accepting polymer having the general formula:

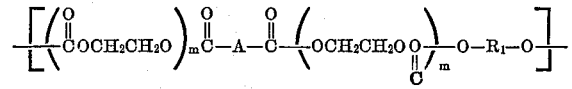

wherein $m$ is a whole number having values from 0 to 1, $R_1$ is as described above and A is a divalent, arylene radical having a formula selected from the group consisting of:

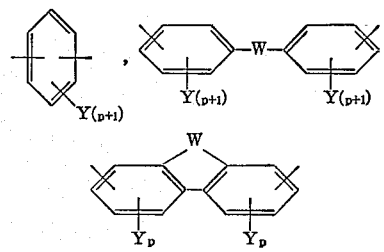

wherein Y is a monovalent radical selected from the group consisting of

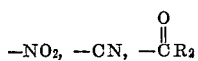

wherein $R_2$ is selected from the group consisting of hydrogen, alkyl having from 1 to 6 carbon atoms, alkoxyl having from 1 to 6 carbon atoms, —$SO_3R_3$, —$CF_3$, —$N(R_3)_3^+$, and halogen, $p$ is as described above and W is a divalent radical having a formula selected from the group consisting of:

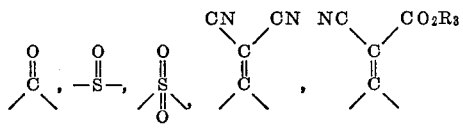

and

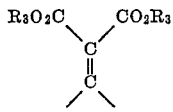

wherein $R_3$ is an alkyl group having from 1 to 6 carbon atoms.

In general, the electron-donating condensation polymers or donors are polyesters or polycarbonates having electron-donating groups in the backbone structure.

Representative donors include the linear, normally solid polyoxalates, succinates, adipates, azelates, sebacates, cyclohexane-1,4-dicarboxylates, isophthalates, terephthalates, biphenyl-4,4'-dicarboxylates and naphthalene-2,6-dicarboxylates of:

phenyliminodiethanol
m-tolyliminodiethanol
p-tolyliminodiethanol
p-aminophenyliminodiethanol
p-hydroxyphenyliminodiethanol
m-anisyliminodiethanol
p-anisyliminodiethanol
p-methylaminophenyliminodiethanol
p-dimethylaminophenyliminodiethanol
2,5-dimethoxyphenyliminodiethanol
3,4,5-trimethoxyphenyliminodiethanol
p-phenyliminodiethanol
2-fluorenyliminodiethanol
7-methoxy-2-fluorenyliminodiethanol
1-naphthyliminodiethanol
2-naphthyliminodiethanol
N,N'-dihydroxyethyl-1,2,3,4-tetrahydroquinoxaline
6-methoxy-N,N'-dihydroxyethyl-1,2,3,4-tetrahydroquinoxaline.

Another group of donor polymers are the homo-polycarbonates of the above alkyliminodiethanols as well as their co-polycarbonates with: ethylene glycol, diethylene glycol, triethylene glycol, tetraethylene glycol, 1,3-propylene glycol, 1,2-propylene glycol, di-1,2-propylene glycol, tri-1,2-propylene glycol, 1,3-butylene glycol, 1,4-butylene glycol, 1,5-pentylene glycol, neopentyl glycol, 1,6-hexylene glycol, 2,2,4,4-tetramethyl-1,3-cyclobutylene glycol, 1,4-cyclohexanedimethanol, hydroquinone, methylhydroquinone, resorcinol, 2,2-bis(4-hydroxyphenyl) propane, 1,1-bis(4-hydroxyphenyl) cyclohexane, 1,1-bis(4-hydroxyphenyl) methane and the like.

The preferred donors are the normally solid, linear polyesters and polycarbonates of:

phenyliminodiethanol
m-tolyliminodiethanol
p-anisyliminodiethanol
2,5-dimethoxyphenyliminodiethanol
3,4,5-trimethoxyphenyliminodiethanol
2-fluorenyliminodiethanol
N,N'-dihydroxyethyl-1,2,3,4-tetrahydroquinoxaline with the aforementioned dicarboxylic acids and dihydroxy compounds.

The electron-accepting condensation polymers or acceptors are also polyesters or polycarbonates having electron-accepting groups in the backbone structure.

Some of the typical acceptors are the linear, normally solid polyesters of ethylene glycol, diethylene glycol, triethylene glycol, tetraethylene glycol, 1,3-propylene glycol, 1,2-propylene glycol, di-1,2-propylene glycol, tri-1,2-propylene glycol, 1,3-butylene glycol, 1,4-butylene glycol, 1,5-pentylene glycol, neopentyl glycol, 1,6-hexylene glycol, 2,2,4,4-tetramethyl-1,3-cyclobutylene glycol, 1,4-cyclohexanedimethanol, hydroquinone, methylhydroquinone, resorcinol, 2,2-bis(4-hydroxyphenyl) propane, 1,1-bis(4-hydroxyphenyl) cyclohexane and 1,1-bis(4-hydroxylphenyl) methane with the following classes of aromatic diacids (in which the Y substituents are —$NO_2$, —CN, —$COCH_3$, —$SO_2CH_3$, —$CO_2CH_3$, —$CF_3$,

and X where X represents halogen):

5-Y-isophthalic acid
Y-terephthalic acid
4,6-di Y-isophthalic acid
2,4-di Y-isophthalic acid
2,5-di Y-terphthalic acid
2,3-di Y-terphthalic acid
3,3'-di Y-benzophenone-4,4'-dicarboxylic acid
3,3',5,5'-tetra Y-benzophenone-4,4'-dicarboxylic acid
3,3'-di Y-diphenylsulfoxide-4,4'-dicarboxylic acid
3,3'-5,5'-tetra Y-diphenylsulfoxide-4,4'-dicarboxylic acid
3,3'-di Y-diphenylsulfone-4,4'-dicarboxylic acid
3,3'-5,5'-tetra Y-diphenylsulfone-4,4'-dicarboxylic acid
2,2-bis-(3'-Y-4'-carboxyphenyl)-1,1-dicyanoethylene
2,2-bis-(3',5'-di Y-4'-carboxyphenyl)-1,1-dicyanoethylene
2,2-bis-(3'-Y-4'-carboxyphenyl)-1-cyano-1-carbomethoxyethylene
2,2-bis-(3',5'-di Y-4'-carboxyphenyl)-1-cyano-1-carbomethoxyethylene
2,2-bis-(3'-Y-4'-carboxyphenyl)-1,1-dicarbomethoxyethylene
2,2-bis-(3',5'-di Y-4'-carboxyphenyl)-1,1-dicarbomethoxyethylene
fluorenone-2,7-dicarboxylic acid
4,5-di Y-fluorenone-2,7-dicarboxylic acid
9-(dicyanomethylene) fluorene-2,7-dicarboxylic acid
4,5-di Y (dicyanomethylene) fluorene-2,7-dicarboxylic acid
9-(dicarbomethoxymethylene) fluorene-2,7-dicarboxylic acid
4,5-di Y (dicarbomethoxymethylene) fluorene-2,7-dicarboxylic acid
9(cyano-carbomethoxymethylene) fluorene-2,7-dicarboxylic acid
4,5-di Y-(cyano-carbomethoxymethylene) fluorene 2,7-dicarboxylic acid
dibenzothiophenoxide-2,9-dicarboxylic acid
4,5-di Y dibenzothiopheneoxide-2,9-dicarboxylic acid
dibenzothiophenedioxide-2,9-dicarboxylic acid
4,5-di Y dibenzothiophenedioxide-2,9-dicarboxylic acid Other typical acceptors are the polycarbonates or the bis 2-hydroxyethyl esters of the above diacids with the aforelisted dihydroxy compounds.

The preferred acceptors are the normally solid, linear polyesters of:

5-nitroisophthalic acid
5-acetylisophthalic acid
nitroterephthalic acid
2,5-dicyanoterephthalic acid
4,6-dinitroisophthalic acid
fluorenone-2,7-dicarboxylic acid
4,5-dinitrofluorenone-2,7-dicarboxylic acid
9-dicyanomethylenefluorene-2,7-dicarboxylic acid
4,5-dinitro-9-dicyanomethylenefluorene-2,7-dicarboxylic acid 3,3'-bistrifluoromethyl diphenylsulfone-4,4'-dicarboxylic acid 3,3'-dichlorodiphenylsulfoxide-4,4'-dicarboxylic acid with the aforementioned dihydroxy compounds. Also preferred are the polycarbonates of these dihydroxy compounds with di(2-hydroxyethyl)5-nitroisophthalate.

The preparation of both the donors, that is, the electron-donating condensation polymers, and the acceptors, that is, the electron-accepting condensation polymers, can be effected by known condensation polymerization methods useful for the preparation of polyesters or polycarbonates.

The method of mixing the electron-accepting condensation polymers with the electron-donating condensation polymers to form the charge-transfer polymer blends of this invention is not narrowly critical and may be effected either in bulk or in solution. For the preparation of charge-transfer polymer blends in bulk it is preferred to intimately mix the donor and acceptor condensation polymers by any mixing methods known in the art. The mixture can be merely melted, extruded or compression molded to produce the charge-transfer polymer blend. When a solution technique is employed a common solvent must be chosen which will readily dissolve both the donor and acceptor condensation polymers. Examples of suitable solvents include: halogenated hydrocarbons such as mehylene chloride, chloroform, 1,1,2,2,-tetrachloroethane, 1,2,3-trichloropropane and the like; amides such as dimethylformamide, dimethyl acetamide, N-methyl pyrrolidone and the like; ethers such as tetrahydrofuran, dioxane, N-methylmorpholine, dimethoxyethane, diethylene glycol dimethylether and the like; aromatic hydrocarbons such as chlorobenzene, o-dichlorobenzene, pyridine, 2-picoline, toluene, anisole and the like; and miscellaneous solvents such a trifluoroacetic acid, hexafluoroisopropanol and the like.

A wide temperature range may be used in the preparation of the charge-transfer polymer blends since the temperatures are not narrowly critical below the decomposition points of the polymers being blended. Pressure is not a factor in the solution blending technique but in the bulk method it is preferred to use a pressure in range of 100 to 6000 p.s.i.g. The exact pressure range chosen will of course depend on the flow properties of the component polymers being employed, i.e., both donor and acceptor polymers.

It is preferred to employ about 5 to 95 weight percent of the donor polymer and about 95 to 5 percent of the acceptor polymer in the preparation of the charge-transfer polymer blend of this invention. It is particularly preferred to employ a range of about 20 to 80 percent and a range of about 45 to 55 percent is most preferred.

While it is preferred to combine one donor polymer with one acceptor polymer, it was found that using more than one donor polymer and/or more than one acceptor polymer in the charge-transfer blends led to interesting and useful products. In fact, by judicious choice of components, a whole spectrum of permanently colored polymeric blends were produced.

While not wishing to be bound by any theory or explanation it is believed that the unexpected properties of these unique charge-transfer polymer blends are due to several factors such as a balance between the electron-accepting strength of acceptor polymers and electron-donating strength of the donor polymers, the geometry of the donor and acceptor groups which enhances maximum interaction between them, and the symmetry of the donor and acceptor polymers which provides a uniform distance between the interacting groups on each of the respective polymers.

The unusual electrical conductivity of many of the charge-transfer polymers of this invention make them suitable for use in electrical components whereas known polymeric materials could only be used when compounded with conductive fillers, such as powdered metals or carbon black.

The inherent, vivid colors of the charge-transfer polymers of this invention, suggest their use not only for aesthetic coloring of films, coatings, and shaped articles but also for use as synthetic textile fibers permanently dyed and resistant to deterioration upon aging.

The invention is further described by the examples which follow. All parts and percentages are by weight unless otherwise specified.

PREPARATION OF NORMALLY SOLID, LINEAR, ELECTRON DONATING POLYMERS

Example 1

A charge consisting of a solution of 18.12 grams of phenyliminodiethanol and 20.30 grams of isophthaloyl chloride and 300 ml. of 1,2-dichloroethane was heated to the reflux temperature under an argon atmosphere in a 3-necked round bottom flask equipped with a thermometer, stirrer, reflux condenser, and additional funnel. Pyridine (30 ml.) was added as rapidly as possible to the solution, which was then refluxed for 4 hours. The solution was cooled and a solid polymer was precipitated by adding it to 1000 ml. of methanol and the polymer isolated by filtration. After washing the polymer several times with water it was dried at 50° C. under reduced pressure. This polymer poly(phenyliminodiethanol isophthalate), having repeating units represented by:

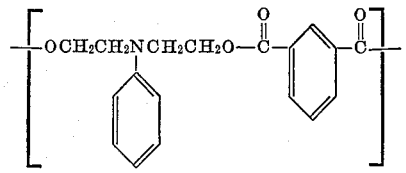

had a softening temperature of about 60° C. and could be cast or extruded into colorless films or coatings. The ultraviolet spectrum of this polymer showed no maximum about 3000 angstroms in chloroform solution.

Example 2

The procedure described in Example 1 was followed with the exception that 21.13 grams of p-anisyliminodiethanol was substituted for the phenyliminodiethanol. The solid polymer, which was isolated, poly (p-anisyliminodiethanol isophthalate), had repeating units represented by:

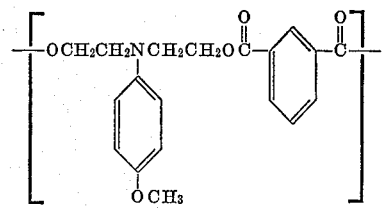

Compression molded films of this polymer were found to be colorless.

Example 3

Example 1 was repeated with the exception that the phenyliminodiethanol was replaced by 19.53 grams of m-tolyliminodiethanol. The solid polymer, poly(m-tolyliminodiethanol isophthalate), had repeating units represented by:

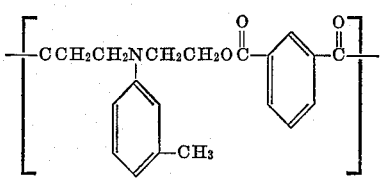

Colorless compression molded films of this polymer softened at 55° C.

Example 4

Example 3 was repeated with the exception that 20.30 grams of terephthaloyl chloride was substituted for the isophthaloyl chloride. A solid polymer, poly(m-tolyliminodiethanol terephthalate), having repeating units represented by:

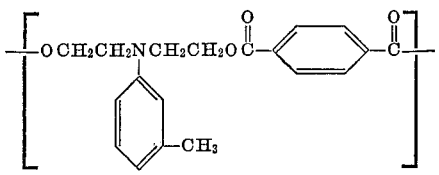

was obtained. This polymer has afforded clear, colorless coatings.

Example 5

Example 1 was repeated with the exception that 24.13 grams of 2,5-dimethoxyphenyliminodiethanol was used in place of phenyliminodiethanol. The solid polymer, poly(2,5-dimethoxyphenyliminodiethanol isophthalate), having repeating units represented by:

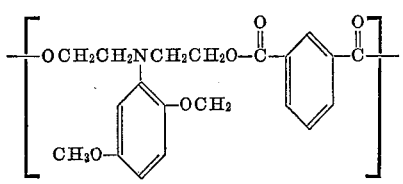

was obtained. This polymer was readily converted to colorless films and coatings.

Example 6

Using the procedure described in Example 1 with the exception that 3,4,5 - trimethoxyphenyliminodiethanol (27.14 grams) was used in place of the phenyliminodiethanol. A solid polymer, poly(3,4,5-trimethoxyphenyliminodiethanol isophthalate), was obtained and had repeating units represented by:

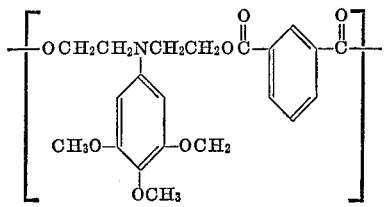

This polymer was compressed molded to afford colorless films.

Example 7

Using the procedure and equipment described in Example 1 a solid polymer, poly(phenyliminodiethanol-bisphenol A carbonate) was prepared from 18.12 grams of phenyliminodiethanol and 35.32 grams of the dichloroformate of bisphenol A, that is, 2,2-bis(p-hydroxyphenyl) propane. This polymeric product having repeating units represented by:

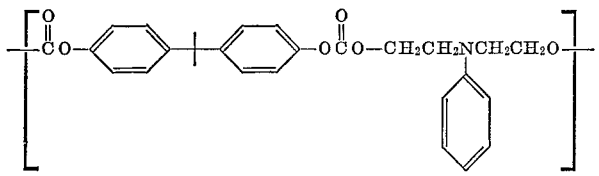

melted at 55° C. and formed films and molded articles which were colorless.

Example 8

Example 7 was repeated with the exception that 21.13 grams of p-anisyliminodiethanol was used in place of the phenyliminodiethanol thus affording the solid polymer, poly(p-anisyliminodiethanol-bisphenol A carbonate), believed to have repeating units represented by:

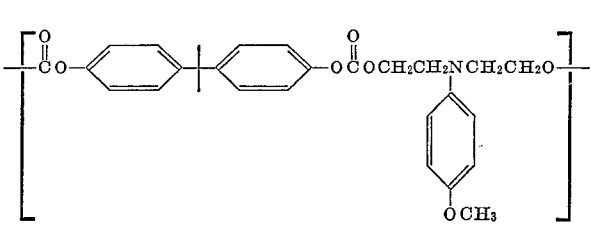

This polymer had a $T_g$ of 60° C., a tensile modulus of 200,000 p.s.i. and formed clear, tough, colorless films and molded objects.

Example 9

Using the procedure described in Example 7, poly(2-fluorenyliminodiethanol-bisphenol A carbonate) was prepared from 25.53 grams of 2-fluorenyliminodiethanol and 35.32 grams of bisphenol A dichloroformate. This solid polymer had repeating units represented by:

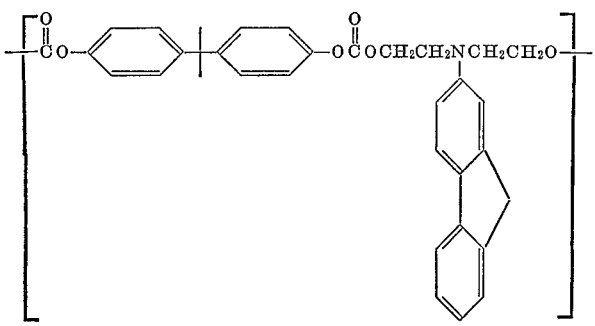

It formed colorless, clear films and coatings.

Example 10

A solid polycarbonate with repeating units represented by:

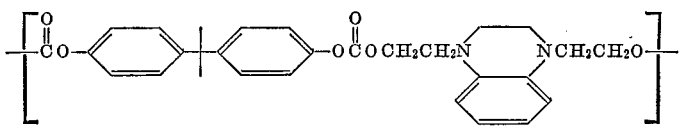

was prepared using the method described in Example 1 but with 22.23 grams of N,N'-dihydroxyethyl-1,2,3,4-tetrahydroquinoxaline and 35.32 grams of bisphenol A dichloroformate as reactants. This polycarbonate, poly (N,N' - dihydroxyethyl - 1,2,3,4 - tetrahydroquinoxaline-bisphenol A carbonate), formed colorless films.

PREPARATION OF NORMALLY SOLID, LINEAR, ELECTRON ACCEPTOR POLYMERS

Example 11

A solution of 11.32 grams of 1,6-hexanediol and 24.80 grams of 5-nitroisophthaloyl chloride in 300 ml. of 1,2-dichloroethane was heated almost to reflux under an argon atmosphere in a 3-necked round bottom flask equipped with a thermometer, reflux condenser, stirrer and dropping funnel. Pyridine (30 ml.) was then added as rapidly as possible and the resulting solution refluxed for 4 hours.

The solution was then cooled and poly(1,6-hexanediol 5-nitroisophthalate) was obtained by precipitation from solution with 1000 ml. of methanol and isolation by filwas then added as rapidly as possible and the resultant solution refluxed for 4 hours. After cooling the solution a polyestercarbonate with repeating units represented by:

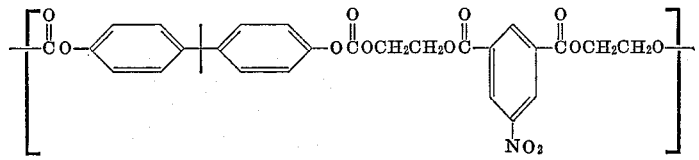

tration. After washing several times with water this polymer was dried at 50° C. under reduced pressure. The dried polymer, whose formula has repeating units represented by:

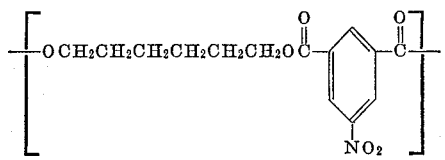

had a softening point of 50° C. and formed colorless, rubbery films by molding and coatings by casting from chloroform. This polymer showed an absorption maximum at 3300 angstroms in chloroform solution.

Example 12

Example 11 was repeated with the exception that 24.80 grams of nitroterephthaloyl chloride was used instead of 5-nitroisophthaloyl chloride. The polymer, poly(1,6-hexanediol nitroterephthalate) when molded into films was colorless, softened at 25° C. and was extremely rubbery. Its structure has repeating units represented by:

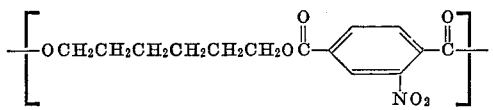

Example 13

Using the procedure described in Example 11 poly (bisphenol A-5-nitrosiophthalate) was produced by substituting 22.83 grams of bisphenol A for the 1,6-hexanediol. The tough polymer, which had repeating units represented by:

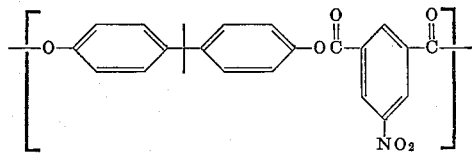

softened at 120° C. and melted at 225° C. and was colorless.

Example 14

Example 11 was repeated with the exception that the 5-nitroisophthaloyl chloride was replaced by 29.30 grams of 4,6-dinitroisophthaloyl chloride and afforded a polyester with repeating units represented by:

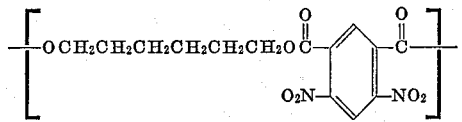

This polymer, poly(1,6-hexanediol-4,6-dinitroisophthalate) had a melting point of 160° C. and coatings produced from it were slightly yellow.

Example 15

A solution 29.92 grams of di(2-hydroxyethyl)-5-nitroisophthalate and 35.23 grams of bisphenol A dichloroformate in 300 ml. of 1,2-dichloroethane was heated almost to reflux under an argon atmosphere in a 3-necked round bottom flask equipped with stirrer, thermometer, reflux condenser, and additional funnel. Pyridine (30 ml.)

was precipitated by addition of methanol to the solution and isolated by filtration. The polyestercarbonate, poly [di(2-hydroxyethyl)-5-nitroisophthalate-bisphenol A carbonate], was washed with water and dried at reduced pressure. This polymer had a $T_g$ of 70° C., formed tough films, fibers and molded objects which were virtually colorless.

Example 16

Using the equipment in the procedure described in Example 11 with 11.82 grams of 1,6-hexanediol and 30.51 grams of fluorenone-2,7-dicarboxylic acid chloride as the reactants afforded poly(1,6-hexanediol-fluorenone-2,7-dicarboxylate) which had repeating units represented by:

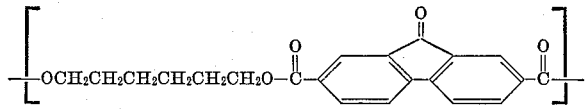

This polymer had a melting point of 220° C. and its films, obtained by compression molding, were pale yellow.

Example 17

Using 11.82 grams of 1,6-hexanediol and 39.21 grams of 4,5-dinitrofluorenone-2,7-dicarboxylic acid chloride as the reactants and using the procedure and equipment described in Example 11 afforded a polyester, poly(1,6-hexanediol - 4,5 - dinitrofluorenone - 2,7 - dicarboxylate), which had repeating units represented by:

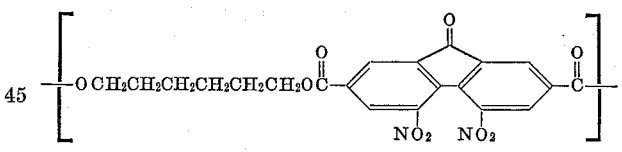

Films and coatings of this polymer were yellow.

Example 18

Using 11.82 grams of 1.6-hexanediol and 34.91 grams of 4-dicyanomethylene fluorene - 2,7 - dicarboxylic acid chloride as the reactants in procedure described in Example 11 afforded a polyester with repeating units represented by:

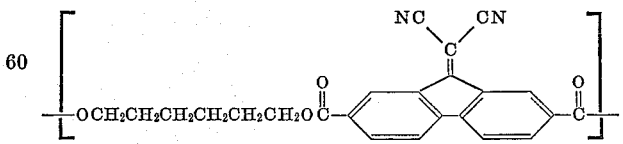

This polymer, poly(1,6-hexanediol-9-dicyanomethylenefluorene-2,7-dicarboxylate) had a melting point of 180° C. and films and coatings produced from it were orange and absorbed at 3650 angstroms.

Example 19

An orange polyester was produced by the interaction of 11.82 grams of 1,6-hexanediol and 44.32 grams of 4,5 - dinitro - 9 - dicyanomethylenefluorene - 2,7 - dicarboxylic acid chloride using the procedure described in Example 11. This polyester, poly(1,6-hexanediol-4,5- dinitro - 9 - dicyanomethylenefluorene - 2,7 - dicarboxylate), with repeating units represented by:

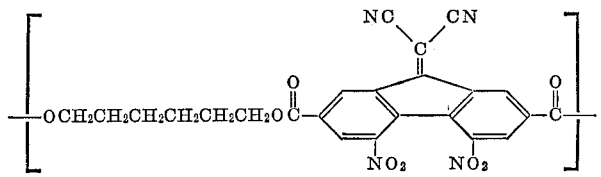

formed films which were high melting and absorbed at 3760 angstroms.

Example 20

Using the procedure described in Example 11 with 9.01 grams of 1,4-butanediol and 25.30 grams of 2,5-dicyanoterephthaloyl chloride as the reactants afforded a tough, colorless polyester with repeating units represented by:

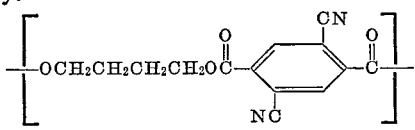

This polyester, poly(1,4-butanediol-2,5-dicyanoterephthalate), was converted to films, molded objects and fibers.

Example 21

Example 20 was repeated with the exception that 34.32 grams of 3,3'-bistrifluoromethyl diphenylsulfone-4,4'-dicarboxylic acid chloride was used in place of the 2,5-dicyanoterephthaloyl chloride. The polyester, 3,3'-bistrifluoromethyl poly(1,4-butanediol-diphenylsulfone) - 4,4'-dicarboxylate obtained with repeating units represented by:

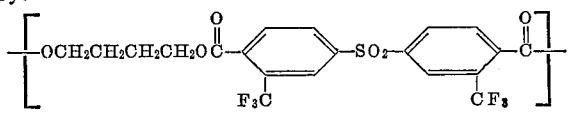

formed tough, colorless films that melted over 300° C.

Example 22

Example 11 was repeated with the exception that 24.71 grams of 5-acetyl-isophthaloyl chloride was used in place of the 5-nitroisophthaloyl chloride. The resultant polymer, poly(1,6-hexanediol-5-acetylisophthalate), with repeating units represented by:

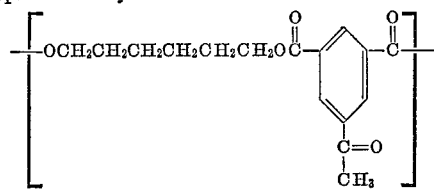

formed colorless films and coatings.

Example 23

Example 11 was repeated with the exception that the reactants were 22.83 grams of Bisphenol A and 31.72 grams of 3,3' - dichlorodiphenylsulfoxide - 4,4' - dicarboxylic acid chloride. The resultant polyester, poly(bisphenol A-3,3' - dichlorodiphenylsulfoxide - 4,4' - dicarboxylate), with repeating units represented by:

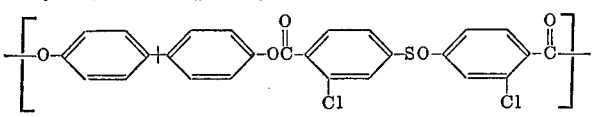

afforded colorless, tough films.

PREPARATION OF MIXTURES OF ELECTRON DONATING AND ELECTRON ACCEPTING POLYMERS

Example 24

Equal weights (namely 5 grams) of the polymers prepared in Example 1 and Example 11 respectfully were dissolved in 100 ml. of chloroform to afford a yellow solution which had an absorption maximum of 3910 angstroms. Evaporation of the chloroform left a homogeneous blend of the two polymers which formed tough films, coatings, and shaped articles that had a permanent yellow-orange color.

Example 25

Mixing 10 grams of the polymer obtained in Example 1 with 10 grams of the polymer obtained in Example 11 by compression molding the mixture at about 100–500 p.s.i.g. and 110° C. for 5 min. afforded a plaque of this mixture having the same properties as the solution cast blend produced in Example 24.

Examples 26 and 27

Charge-transfer polymer blends were made from the donor polymer, poly(phenyliminodiethanolisophthalate) of Example 1 and poly(1,6-hexanediolnitroterephthalate), the acceptor polymer of Example 12 using both the solution method of Example 24 and the compression molding technique of Example 25. In each case the charge transfer polymer blend was a permanent yellow-orange color which could be converted to tough, molded and shaped articles.

Examples 28 and 29

Charge-transfer polymer blends were made by mixing the donor polymer prepared in Example 2 and acceptor polymer prepared in Example 13 mixed in a 1:4 ratio by both solution casting technique of Example 24 in compression molding technique of Example 25. In both cases these blends afforded orange films. These blends showed an absorption maximum at 3980 angstroms and were used to make coatings and shaped articles.

Examples 30 and 31

A 1:1 blend of the donor polymer made in Example 7 and the acceptor polymer made in Example 15 was made by both the methods of Example 20 and Example 21. The resultant blend had a tensile modulus of 360,000 p.s.i., formed very tough, clear films and exhibited a permanent orange color.

Example 32

A charge-transfer blend prepared by molding a mixture of equal parts of the donor polymer prepared in Example 6 which had a volume resistivity of $10^{16}$ ohm-centimeters and the acceptor polymer prepared in Example 14 which had a volume resistivity of $10^{17}$ ohm-centimeters produced an orange-red film having an increased conductivity, that is, a volume resistivity of $10^{12}$ ohm-centimeters.

Example 33

Equal weights of the donor polymer obtained in Example 4 and acceptor polymer obtained in Example 16 (5 grams) were dissolved in 100 ml. of dimethylacetamide and the resultant solution cast onto a clean glass plate. Evaporation of the dimethylacetamide afforded a deep yellow film that exhibited high impact strength.

Example 34

A charge-transfer polymer blend was obtained by mixing 7 grams of the donor polymer obtained from Example 5 and 3 grams of the acceptor polymer obtained in Example 17 in 100 ml. of chloroform. The solution was a bright orange color absorbing at 4500 angstroms. Evaporation of the chloroform left a tough orange film. Fibers were drawn from a melt of this polymer blend and the fibers were permanently colored orange.

Example 35

A charge-transfer polymer blend was prepared by dissolving 3 grams of the donor polymer obtained in Example 8 (volume resistivity equals $10^{16}$ ohm-centimeters) with 3 grams of the acceptor polymer obtained in Example 18 (volume resistivity=$10^{14}$ ohm-centimeters) in 100 ml. of dimethylformamide. Evaporation of the solvent left a red polymer blend which had a volume resistivity of $10^9$ ohm-centimeters.

Example 36

The charge-transfer polymer blend was obtained by compression molding a mixture of 10 grams of the donor polymer obtained in Example 10 with 10 grams of the acceptor polymer obtained in Example 19. The resultant compression molded film was purple. The volume resistivity of the polymer blend was $10^6$ ohm-centimeters as compared to a volume resistivity of $10^{15}$ ohm-centimeter for the donor polymer and acceptor polymer measured alone.

Example 37

A mixture of 6 grams of the donor polymer obtained in Example 3 and 4 grams of the acceptor polymer obtained in Example 20 was compression molded to form a tough yellow film which afforded permanetly colored molded objects.

Example 38

The donor polymer obtained in Example 9 (3 grams) and 5 grams of the acceptor polymer prepared in Example 21 were dissolved in 100 ml. of dimethylformamide. Evaporation of the dimethylformamide afforded a charge-transfer polymer blend which produced pale yellow films and could be drawn into tough fibers.

Example 39

A mixture of 10 grams of the donor polymer prepared in Example 8 and 5 grams of the acceptor prepared in Example 22 was compression molded to form an orange film of a charge-transfer polymer blend. The color of this film was permanent.

Examples 40 and 41

Charge-transfer polymer blends were prepared from the donor polymer prepared in Example 10 (4 grams) and 6 grams of the acceptor polymer prepared in Example 23 both by compression molding and by casting from a solution in 150 ml. of dimethylformamide. In both instances the polymer blend was orange-red in color and extremely tough.

The electrical conductivity of the charge-transfer polymer blends of this invention were determined by the procedure described in ASTM–257–61.

Although the invention has been described in its preferred forms with a certain degree of particularity, it is understood that the present disclosure has been made only by way of example, and that numerous changes can be made without departing from the spirit and scope of the invention.

What is claimed is:
1. A mixture of linear polymers comprising:
   (a) 5 to 95 percent by weight of an electron donor polymer having the general formula

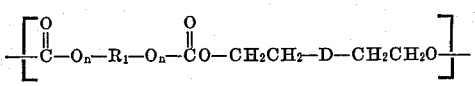

wherein $R_1$ is selected from the group consisting of divalent hydrocarbon radicals having from 1 to about 30 carbon atoms, $n$ is a whole number having a value from 0 to 1 and D is a divalent nitrogen radical having a formula selected from the following:

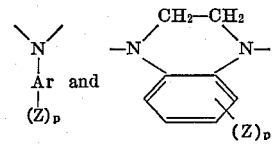

wherein Ar is an aromatic hydrocarbon having from 6 to about 30 carbon atoms, Z is a monovalent radical selected from the group consisting of alkylamino, dialkylamino, amino, alkoxyl, and hydroxyl radicals with the alkyl groups having from 1 to 6 carbon atoms and $p$ is an integer having values from 0 to 3; and
   (b) about 95 to 5 percent by weight of an electron accepting polymer having the general formula:

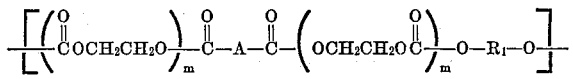

wherein $m$ is a whole number having values from 0 to 1, $R_1$ is as described above and A is a divalent, arylene radical having a formula selected from the group consisting of:

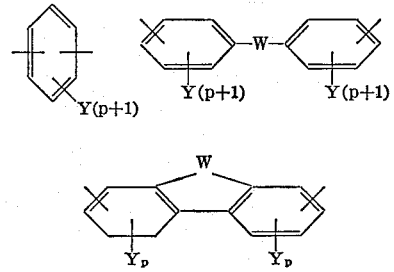

and wherein Y is a monovalent radical selected from the group consisting of

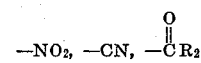

wherein $R_2$ is selected from the group consisting of hydrogen, alkyl having from 1 to 6 carbon atoms, alkoxyl having from 1 to 6 carbon atoms, $-SO_3R_3$, $-CF_3$, $-N(R_3)_3{}^+$ and halogen, $p$ is as described above and W is a divalent radical having a formula selected from the group consisting of:

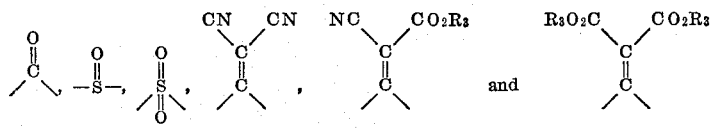

wherein $R_3$ is an alkyl group having from 1 to 6 carbon atoms.
2. The mixture claimed in claim 1 wherein $R_1$ is derived from the group consisting of alkanes, cycloalkanes, aromatic hydrocarbons and aryl-alkanes.
3. The mixture claimed in claim 2 wherein

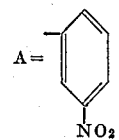

4. The mixture claimed in claim 2 wherein

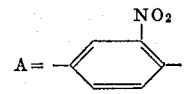

5. The mixture claimed in claim 2 wherein

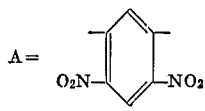

6. The mixture claimed in claim 2 wherein

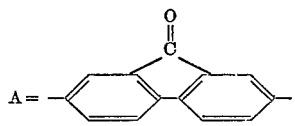

7. The mixture claimed in claim 2 wherein

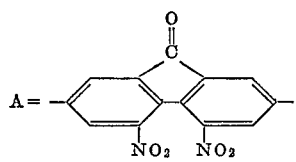

8. The mixture claimed in claim 2 wherein

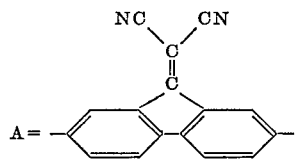

9. The mixture claimed in claim 2 wherein

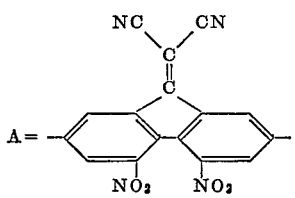

10. The mixture claimed in claim 2 wherein

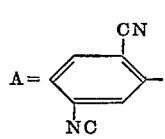

11. The mixture claimed in claim 2 wherein

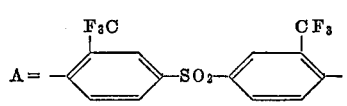

12. The mixture claimed in claim 2 wherein

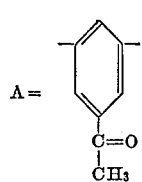

13. The mixture claimed in claim 2 wherein

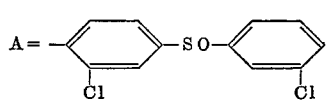

14. The mixture claimed in claim 2 wherein

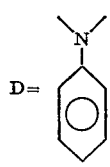

15. The mixture claimed in claim 2 wherein

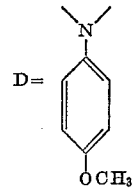

16. The mixture claimed in claim 2 wherein

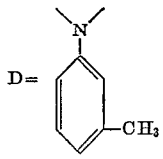

17. The mixture claimed in claim 2 wherein

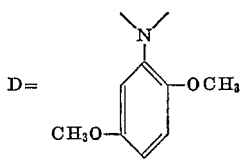

18. The mixture claimed in claim 2 wherein

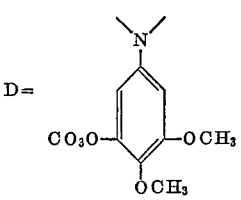

19. The mixture claimed in claim 2 wherein

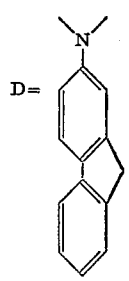

20. The mixture claimed in claim 2 wherein

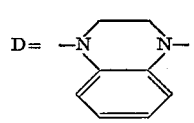

21. The mixture claimed in claim 1 wherein the donor polymer is poly(phenyliminodiethanol isophthalate) and and the acceptor polymer is poly(1,6-hexanediol-5-nitroisophthalate).

22. The mixture claimed in claim 1 wherein the donor polymer is poly(phenyliminodiethanol isophthalate) and the acceptor polymer is poly(1,6-hexanediolnitroterephthalate).

23. The mixture claimed in claim 1 wherein the donor polymer is poly(p-anisyliminodiethanol-isophthalate) and the acceptor polymer is poly(Bisphenol A-5-nitroisophthalate).

24. The mixture claimed in claim 1 wherein the donor polymer is poly(phenyliminodiethanol-bisphenol A carbonate) and the acceptor polymer is poly di(2-hydroxyethyl)-5-nitroisophthalate-Bisphenol A carbonate.

25. The mixture claimed in claim 1 wherein the donor polymer is poly(3,4,5 - trimethoxyphenyliminodiethanol isophthalate) and the acceptor polymer is poly(1,6-hexanediol-5-nitroisophthalate).

26. The mixture claimed in claim 1 wherein the donor polymer is poly(m-tolyliminodiethanol terephthalate) and the acceptor polymer is poly(1,6-hexanediol-fluorenone-2,7-dicarboxylate).

27. The mixture claimed in claim 1 wherein the donor polymer is poly(2,5-dimethoxyphenylimino-diethanol isophthalate) and the acceptor polymer is poly(1,6-hexanediol-4,5-dinitrofluorenone-2,7-dicarboxylate).

28. The mixture claimed in claim 1 wherein the donor polymer is poly(p-anisyliminodiethanol-Bisphenol A carbonate) and the acceptor polymer is poly(1,6-hexanediol-9-dicyanomethylenefluorene-2,7-dicarboxylate).

29. The mixture claimed in claim 1 wherein the donor polymer is poly(N,N'-dihydroxyethyl-1,2,3,4-tetrahydroquinoxaline-Bisphenol A carbonate) and the acceptor polymer is poly(1,6-hexanediol-, 4,5-dinitro-9-dicyanomethylenefluorene-2,7-dicarboxylate).

References Cited

UNITED STATES PATENTS 3,423,483  1/1969  Anyos et al. _____ 260—860

OTHER REFERENCES

Journ. Poly. Sci., Polymer Letters, Upadhyay et al., pp. 369–70, "Proton Transfer—Deeply Colored—Polymers."

WILLIAM SHORT, Primary Examiner

E. WOODBERRY, Assistant Examiner

U.S. Cl. X.R.

252—500